United States Patent
Jiao et al.

(10) Patent No.: US 12,175,691 B1
(45) Date of Patent: Dec. 24, 2024

(54) METHOD AND DEVICE FOR MAPPING THREE-DIMENSIONAL (3D) POINT CLOUD MODEL BASED ON DEEP LEARNING

(71) Applicants: CHINA UNIVERSITY OF GEOSCIENCES (WUHAN), Wuhan (CN); Institute of Rock and Soil Mechanics, Chinese Academy of Sciences, Wuhan (CN)

(72) Inventors: Yuyong Jiao, Wuhan (CN); Xuefeng Yan, Wuhan (CN); Yule Hu, Wuhan (CN); Zengqiang Han, Wuhan (CN); Yiteng Wang, Wuhan (CN); Luyi Shen, Wuhan (CN); Junpeng Zou, Wuhan (CN); Fei Zheng, Wuhan (CN); Peng Zhang, Wuhan (CN)

(73) Assignees: CHINA UNIVERSITY OF GEOSCIENCES (WUHAN), Wuhan (CN); Institute of Rock and Soil Mechanics, Chinese Academy of Sciences, Wuhan (CN)

(*) Notice: Subject to any disclaimer, the term of this patent is extended or adjusted under 35 U.S.C. 154(b) by 0 days.

(21) Appl. No.: 18/398,187

(22) Filed: Dec. 28, 2023

(30) Foreign Application Priority Data

Jul. 10, 2023 (CN) .............................. 202310843903

(51) Int. Cl.
*G06T 7/33* (2017.01)
*G06T 5/60* (2024.01)
(Continued)

(52) U.S. Cl.
CPC ................ *G06T 7/344* (2017.01); *G06T 5/60* (2024.01); *G06T 7/80* (2017.01); *G06T 17/20* (2013.01);
(Continued)

(58) Field of Classification Search
CPC . G06T 2207/20081; G06T 2207/20084; G06T 7/0012; G06T 19/006; G06T 7/11;
(Continued)

(56) References Cited

U.S. PATENT DOCUMENTS 10,373,325 B1\* 8/2019 Karsch ................... G06V 20/64
10,515,477 B2 12/2019 Yago Vicente et al.
(Continued)

*Primary Examiner* — Ming Wu
(74) *Attorney, Agent, or Firm* — True Shepherd LLC; Andrew C. Cheng

(57) ABSTRACT

A method for mapping a three-dimensional (3D) point cloud model based on deep learning includes: extracting features of image data by using a convolutional neural network; extracting features of point cloud data by using a PointNet point cloud processing network, and constructing a 3D model of the point cloud data by using a triangular mesh; aligning the 3D model and an image spatially and temporally; performing projection mapping on the aligned 3D model and image, and superimposing location information in the point cloud data onto texture information of the image to obtain a first fused image; fusing the features of the point cloud data and the features of the image data to obtain a second fused image with a fused feature; and superimposing the first fused image onto the second fused image, and obtaining a superimposition weight by using the convolutional neural network, to generate a mapped 3D model.

7 Claims, 3 Drawing Sheets

(51) Int. Cl.
*G06T 7/80* (2017.01)
*G06T 17/20* (2006.01)
*G06V 10/77* (2022.01)
*G06V 10/80* (2022.01)
*G06V 10/82* (2022.01)

(52) U.S. Cl.
CPC ........ *G06V 10/7715* (2022.01); *G06V 10/806* (2022.01); *G06V 10/82* (2022.01); *G06T 2207/10024* (2013.01); *G06T 2207/10028* (2013.01); *G06T 2207/20081* (2013.01); *G06T 2207/20084* (2013.01); *G06T 2207/20221* (2013.01); *G06T 2210/56* (2013.01)

(58) Field of Classification Search
CPC ............. G06T 2207/20221; G06T 5/50; G06T 2207/10028; G06T 7/136; G06T 2207/10081; G06T 5/40; G06T 7/62; G06T 2207/10116; G06T 7/12; G06T 7/13; G06T 7/73; G06T 2207/10024; G06T 2207/20076; G06T 2210/41; G06T 7/33; G06T 7/90; G06T 2207/10004; G06T 2207/10016; G06T 2207/10132; G06T 2207/30096; G06T 2207/30252; G06T 5/70; G06T 7/0002; G06T 7/0014; G06T 7/10; G06T 7/70; G06T 11/60; G06T 15/04; G06T 17/00; G06T 17/05; G06T 17/20; G06T 19/20; G06T 2207/10012; G06T 2207/10048; G06T 2207/20021; G06T 2207/30024; G06T 2207/30048; G06T 2207/30101; G06T 2207/30181; G06T 5/94; G06T 7/30; G06T 7/55; G06T 11/008; G06T 15/20; G06T 17/10

See application file for complete search history.

(56) References Cited

U.S. PATENT DOCUMENTS

| | | |
|---|---|---|
| 10,872,457 B1 | 12/2020 | Hu et al. |
| 11,557,077 B2 | 1/2023 | Distler et al. |
| 2013/0135450 A1* | 5/2013 | Pallone ................ A61B 5/0091 |
| | | 348/50 |
| 2017/0046868 A1* | 2/2017 | Chernov ................ G06T 7/246 |
| 2019/0188871 A1* | 6/2019 | Fletcher ............... H04N 13/156 |

* cited by examiner

METHOD AND DEVICE FOR MAPPING THREE-DIMENSIONAL (3D) POINT CLOUD MODEL BASED ON DEEP LEARNING

CROSS-REFERENCE TO RELATED APPLICATIONS

This application is claims priority to Chinese Patent Application No. 202310843903.5 with a filing date of Jul. 10, 2023. The content of the aforementioned application, including any intervening amendments thereto, is incorporated herein by reference.

TECHNICAL FIELD

The present disclosure relates to the field of digital image processing, and in particular, to a method and device for mapping a three-dimensional (3D) point cloud model based on deep learning.

BACKGROUND

Usually, there are two common methods for mapping a 3D point cloud model: texture mapping and projection mapping. Through the mapping, point cloud data and image data can be fused. A point cloud model is typically constituted by a large quantity of points. Coordinate information of these points can occupy a large amount of storage space. Through the mapping, a small quantity of texture pixels can be used to represent massive geometric details, thereby reducing storage and transmission costs of data. During the mapping, rendering is usually much faster than geometric calculation. During the rendering, only a texture color needs to be applied to each vertex or point, without any complex geometric transformation and lighting calculation, thereby improving rendering efficiency.

However, in a low-illuminance underground dark environment, a texture feature of a pixel is not obvious, and the mapping methods often fail to achieve a distinctive imaging effect. A mapping method in the underground dark environment needs to map point coordinates of a 3D model onto two-dimensional (2D) image coordinates, and highlight an image feature and a point cloud feature.

SUMMARY OF PRESENT INVENTION

In order to solve the above problems, the present disclosure provides a method for mapping a 3D point cloud model based on deep learning, including following steps:
S1, collecting point cloud data by using a sonar and a laser radar, capturing image data by using a camera, and preprocessing the point cloud data and the image data;
S2, processing preprocessed image data by using a convolutional neural network, and extracting features of the image data to obtain a feature-enhanced image; and processing preprocessed point cloud data by using a PointNet point cloud processing network, extracting features of the point cloud data, and constructing a 3D model of the point cloud data by using a triangular mesh;
S3, calibrating the laser radar and the camera, determining a geometric relationship between the laser radar and the camera, and aligning the 3D model and the enhanced image spatially and temporally;
S4, performing projection mapping from the enhanced image onto the aligned 3D model, and superimposing location information in the point cloud data onto texture information of the image to obtain a fused image 1 with point cloud geometry information and image color information;
S5, fusing the features of the point cloud data and the features of the image data to obtain a fused image 2 with a fused feature; and
S6, superimposing the fused image 1 onto the fused image 2 by training the convolutional neural network, to generate a mapped 3D model.

The present disclosure further provides a device for mapping a 3D point cloud model based on deep learning, including:
a processor; and
a memory storing a computer program that can run on the processor; where
the computer program is executed by the processor to implement the method for mapping a 3D point cloud model based on deep learning.

The technical solutions provided by the present disclosure have following beneficial effects:
According to the method for mapping a 3D point cloud model based on deep learning in the present disclosure, features of image data are extracted by using a convolutional neural network. Features of point cloud data are extracted by using a PointNet point cloud processing network, and a 3D model of the point cloud data is constructed by using a triangular mesh. The 3D model and an enhanced image are aligned spatially and temporally. Projection mapping is performed on the aligned 3D model and enhanced image, and location information in the point cloud data is superimposed onto texture information of the image to obtain a fused image 1 with point cloud geometry information and image color information. The features of the point cloud data and the features of the image data are fused to obtain a fused image 2 with a fused feature. The fused image 1 is superimposed onto the fused image 2, and a superimposition weight is obtained by using the convolutional neural network, to generate a mapped 3D model. Compared with a traditional mapping method, the method provided in the present disclosure is more universal. In an underground dark environment, the method provided in the present disclosure can achieve a good imaging effect, and can better highlight features of a 3D point cloud and an image while maintaining imaging accuracy, to better meet an engineering requirement.

DETAILED DESCRIPTION OF THE EMBODIMENTS

In order to make the objectives, technical solutions, and advantages of the present disclosure clearer, implementations of the present disclosure will be further described in detail in conjunction with the accompanying drawings.

Figure 1:
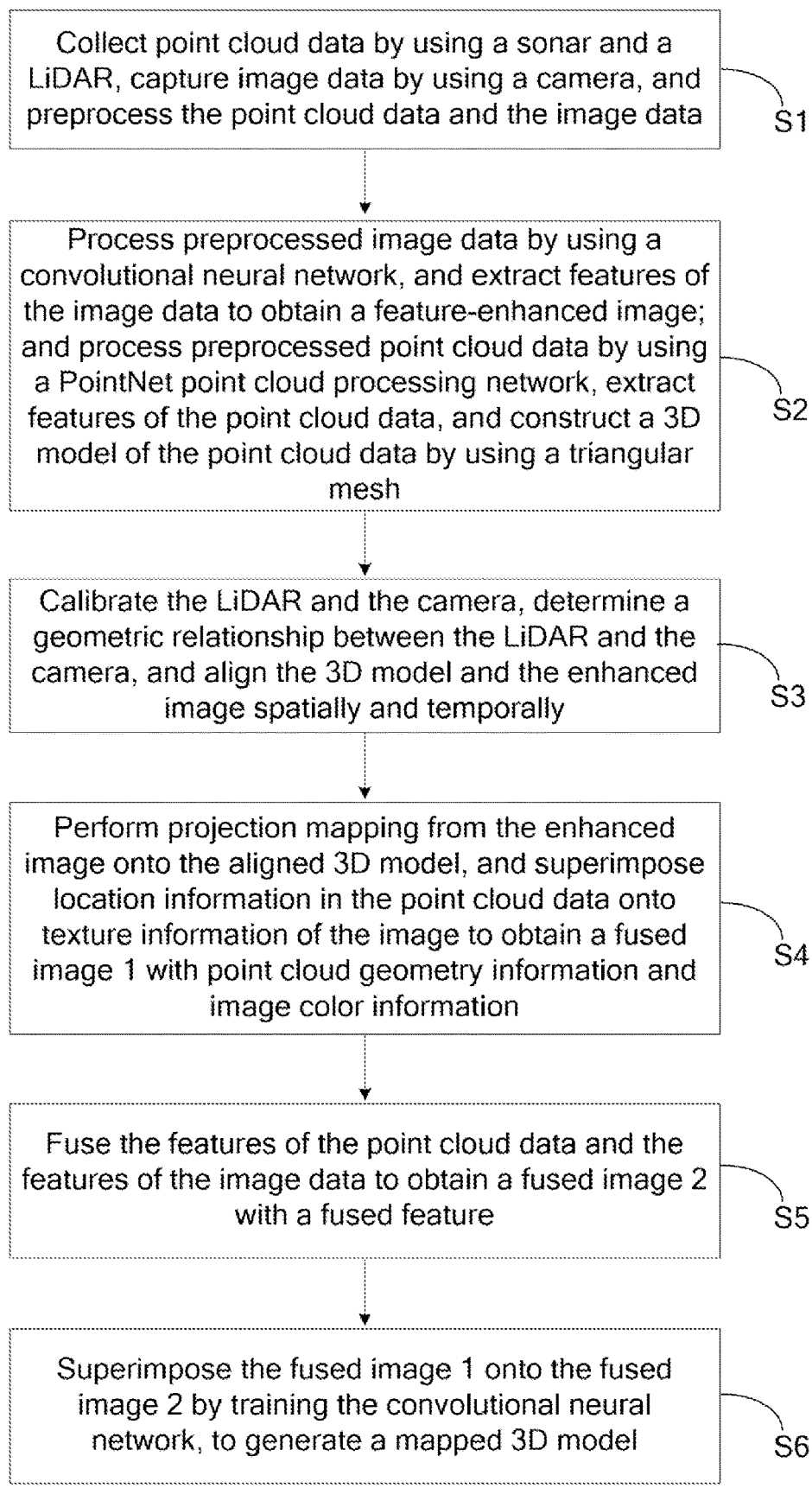
FIG. 1 is a flowchart showing a method for mapping a 3D point cloud model based on deep learning according to an embodiment of the present disclosure.
Figure 2:
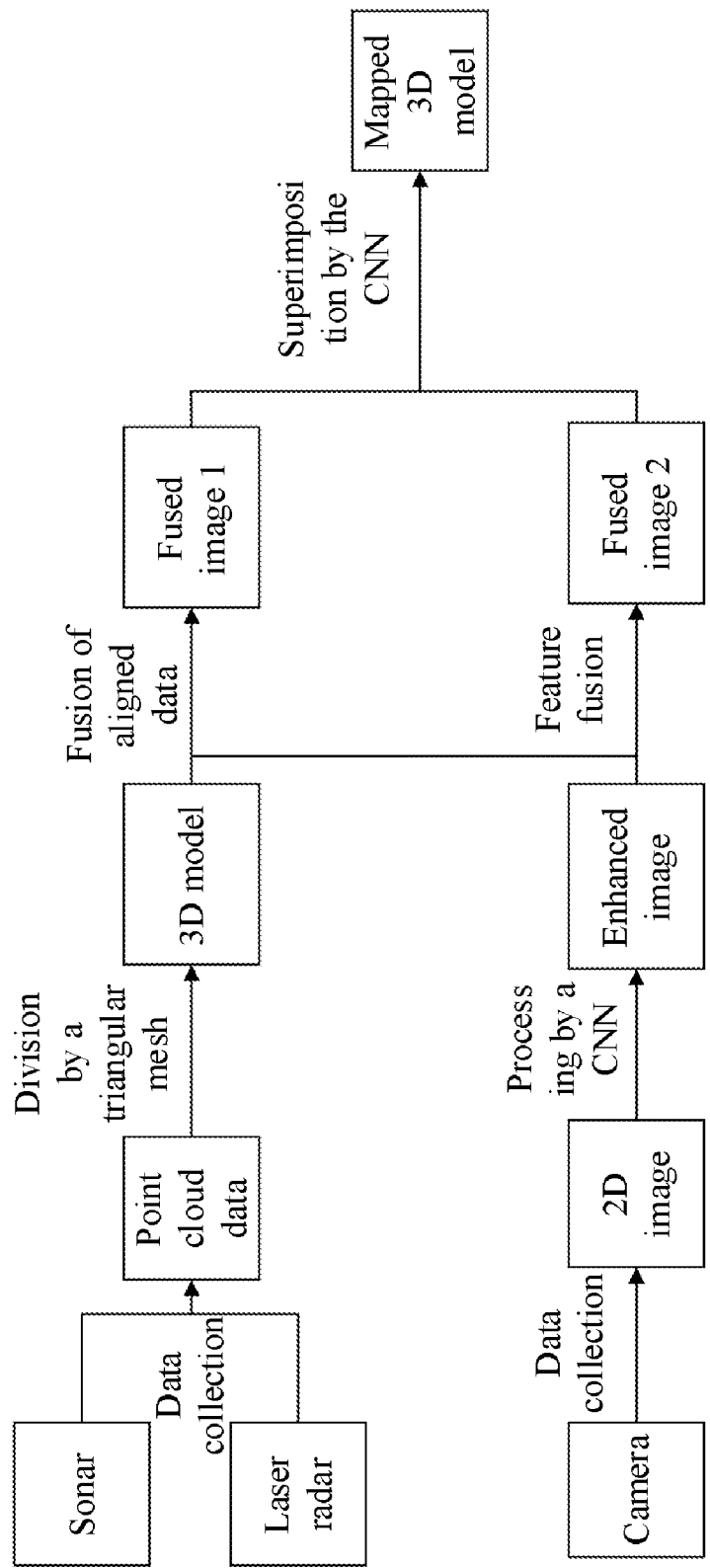
FIG. 2 is a flowchart showing a method for mapping a 3D point cloud model based on deep learning according to an embodiment of the present disclosure.

FIG. 1 is a flowchart showing a method for mapping a 3D point cloud model based on deep learning according to an embodiment. A flow block diagram of the method for mapping a 3D point cloud model based on deep learning according to this embodiment of the present disclosure is shown in FIG. 2. The method for mapping a 3D point cloud model based on deep learning specifically includes following steps:

In step S1, point cloud data is collected by using a sonar and a laser radar, image data is captured by using a camera, and the point cloud data and the image data are preprocessed. The preprocessing of the point cloud data includes normalization, uniform sampling, and filling. The normalization can scale the point cloud data to a unified scale range to eliminate an impact of a scale difference on a network. The uniform sampling can extract a fixed quantity of points from a point cloud to make the network robust to point clouds of different densities. The filling can add a virtual point at a point location when there are insufficient point clouds, to meet a requirement of a network input. The preprocessing of the image data includes resizing, cropping, scaling, and graying.

In step S2, the preprocessed image data is processed by using a convolutional neural network, and features of the image data are extracted to obtain a feature-enhanced image. Preprocessed point cloud data is processed by using a PointNet point cloud processing network, features of the point cloud data are extracted, and a 3D model of the point cloud data is constructed by using a triangular mesh.

Figure 3:
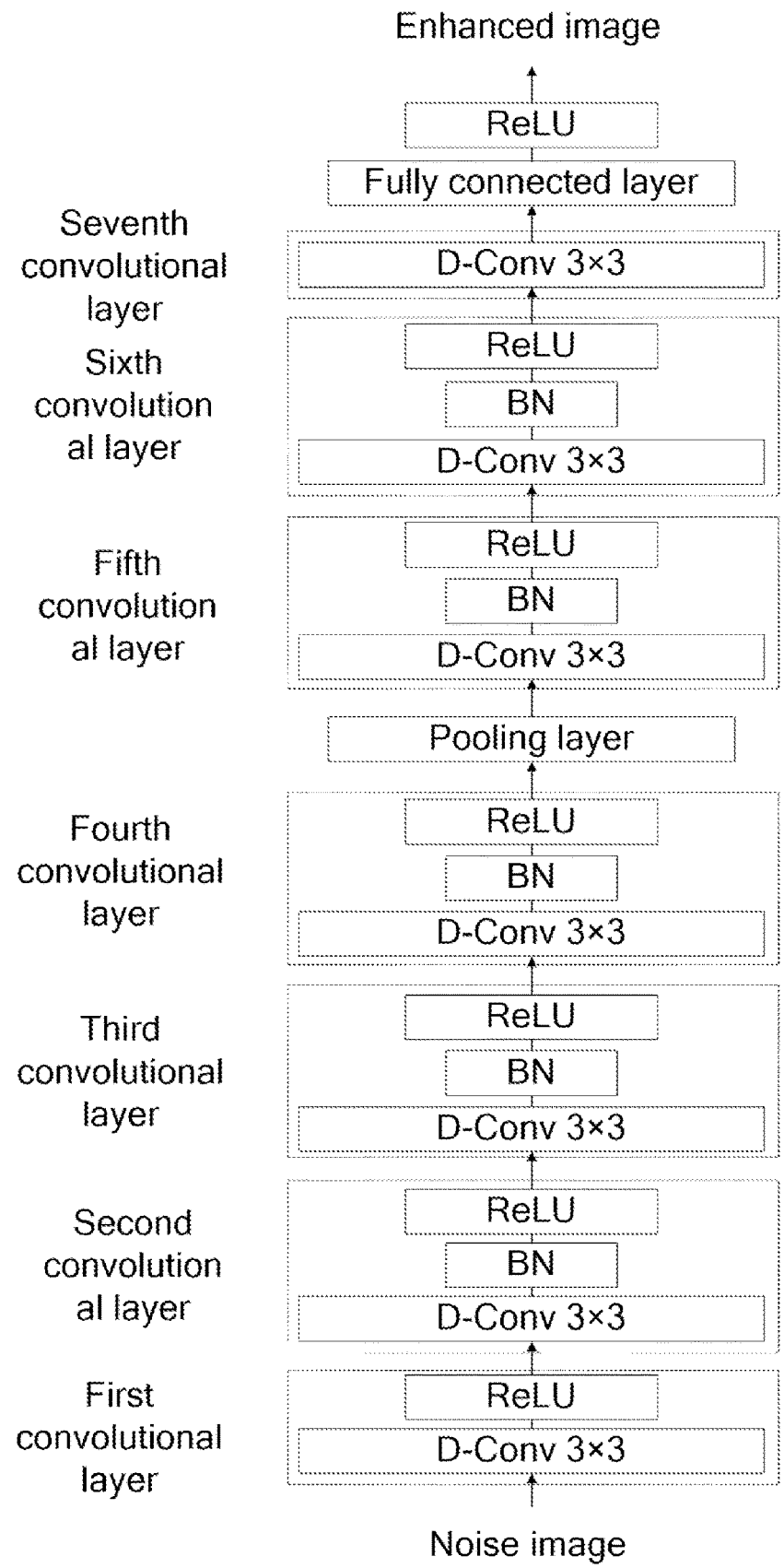
FIG. 3 is a structural diagram showing a convolutional neural network according to an embodiment of the present disclosure.

The step of processing the preprocessed image data by using the convolutional neural network, and extracting the features of the image data to obtain the feature-enhanced image specifically includes following operations:

(1) The convolutional neural network is constructed, including seven convolutional layers, one pooling layer, on activation function, and one fully connected layer. For a structure of the convolutional neural network, reference can be made to FIG. 3.

Convolution: A plurality of convolution kernels are used for a convolution operation to extract an image feature. Each convolutional kernel can detect different features, such as an edge and a texture. The convolution operation can be achieved by sliding the convolution kernel, and performing element-by-element multiplication and summation on the convolution kernel and the image.

Activation function: It performs non-linear mapping on an output of the convolutional layer, and introduces a nonlinear feature.

Pooling layer: It reduces a size of a feature map, reduces computational complexity, and extracts a more significant feature. Common pooling operations include maximum pooling and average pooling.

Convolution and activation functions: A plurality of such convolution and activation functions can be stacked to extract a higher-level feature.

An input of the convolutional neural network is output after passing through a first convolutional layer, a second convolutional layer, a third convolutional layer, a fourth convolutional layer, the pooling layer, a fifth convolutional layer, a sixth convolutional layer, a seventh convolutional layer, the fully connected layer, and the activation function in sequence.

In this embodiment, the first convolutional layer includes one atrous convolution with an atrous factor of 1 and a convolution kernel size of 3×3, and one activation function ReLU, and has 64 feature maps.

The second convolutional layer includes one atrous convolution with an atrous factor of 2 and a convolution kernel size of 3×3, one batch normalization layer, and one activation function ReLU, and has 64 feature maps.

The third convolutional layer includes one atrous convolution with an atrous factor of 3 and a convolution kernel size of 3×3, one batch normalization layer, and one activation function ReLU, and has 64 features.

The fourth convolutional layer includes one atrous convolution with an atrous factor of 4 and a convolution kernel size of 3×3, one batch normalization layer, and one activation function ReLU, and has 64 features.

The fifth convolutional layer includes one atrous convolution with an atrous factor of 3 and a convolution kernel size of 3×3, one batch normalization layer, and one activation function ReLU, and has 64 feature maps.

The sixth convolutional layer includes one atrous convolution with an atrous factor of 2 and a convolution kernel size of 3×3, one batch normalization layer, and one activation function ReLU, and has 64 feature maps.

The seventh convolutional layer includes one atrous convolution with an atrous factor of 1 and a convolution kernel size of 3×3, and has 64 features.

(2) The preprocessed image data is input into the constructed convolutional neural network for forward propagation, an output is calculated layer by layer, and the features are extracted to obtain the feature-enhanced image. In each convolution layer, features with different scales and directions are extracted from an input image through the convolution operation. The pooling layer scales down the feature map, reduces parameters, and preserves important features. This process can be achieved by stacking a plurality of convolutional layers and pooling layers, thereby gradually extracting a more advanced feature.

(3) The obtained feature-enhanced image is post-processed to further optimize quality of the image, including contrast adjustment, histogram equalization, and denoising.

The step of processing the preprocessed point cloud data by using the PointNet point cloud processing network, and extracting the features of the point cloud data specifically includes following operations:

(1) A PointNet model is constructed, including an input transformation network, a feature extraction network, a global feature extraction network, and a classifier.

The input transformation network is configured to learn a transformation matrix of the point cloud data, and align the point cloud data to canonical space. The feature extraction network is configured to extract a local feature representation of each point in the point cloud data. The global feature extraction network aggregates a local feature of each point in the point cloud data into a global feature representation as a whole. The classifier maps a global feature onto an output category.

(2) The preprocessed point cloud data is input into the constructed PointNet model for forward propagation, and an output is calculated layer by layer to obtain feature-enhanced point cloud data. In the input transformation network, coordinates of the point cloud data are transformed through the learned transformation matrix. In the feature extraction network, the local feature of each point is extracted by using a multilayer perceptron and other operations. In the global feature extraction network, the local feature is aggregated into the global feature representation as a whole. This process can be achieved by stacking a plurality of blocks or layers.

(3) After the feature-enhanced point cloud data is post-processed, quality of the point cloud is further optimized. For example, filtering such as Gaussian filtering or median filtering is performed to remove noise and an outlier. Point cloud registration is performed to align point clouds with different angles of view or time periods to obtain a more complete and consistent point cloud representation.

In step S3, the laser radar and the camera are calibrated, a geometric relationship between the laser radar and the camera is determined, and the 3D model and the enhanced image are aligned spatially and temporally.

In this embodiment, the step of calibrating the laser radar and the camera includes calibrating internal and external parameters of the laser radar, calibrating internal and external parameters of the camera, and determining the geometric relationship between the laser radar and the camera. The internal and external parameters of the laser radar or the camera include a location, a posture, a field-of-view angle, and a distortion parameter.

Laser data and visual data are aligned temporally to ensure that the laser data and the visual are collected at a same time point. This can be achieved by using a timestamp or a synchronization signal.

In step S4, projection mapping from the enhanced image onto the aligned 3D model is performed, and location information in the point cloud data is superimposed onto texture information of the image to obtain a fused image 1 with point cloud geometry information and image color information.

In this embodiment, texture mapping is performed on the point cloud data and the corresponding image, and a color value of a corresponding location on the image is assigned to a point in the point cloud data.

Specifically:

The aligned 3D model is projected onto the enhanced image, and 3D coordinates of the 3D model are mapped onto 2D coordinates of the enhanced image. This involves mapping 3D coordinates of the point cloud onto the 2D coordinates of the image. During the projection, it is required to consider the internal parameters (such as a focal length, and principal point coordinates) and the external parameters (such as a camera posture and a position) of the camera, and coordinates of each point in the point cloud.

The aligned enhanced image is back-projected onto the 3D model, and a pixel in the enhanced image is back-projected onto 3D space of the 3D model. This involves mapping 2D pixel coordinates of the image onto the 3D coordinates of the point cloud. During the back-projection, it is required to use the internal and external parameters of the camera, and coordinates of each point in the image.

Projected and back-projected data is registered to ensure a spatial correspondence between the laser data and the visual data. A registration algorithm (such as an iterative nearest point algorithm or a feature matching algorithm) needs to be used to find a correspondence between the point cloud and the image, and adjust their locations and postures.

In step S5, the features of the point cloud data and the features of the image data are fused to obtain a fused image 2 with a fused feature.

Specifically:

The features of the point cloud data and the features of the image data are matched by using the feature matching algorithm, and an association between the point cloud data and the image data is established. The features of the point cloud data include coordinates, a normal vector, a curvature, and a surface descriptor such as VFH or SHOT of the point. The features of the image data include a color histogram, a texture feature, an edge feature, a corner feature, and the like. The features of the point cloud data and the features of the image data are matched to find a correspondence between the point cloud data and the image data. The feature matching algorithm such as nearest neighbor matching or RANSAC can be used. During the matching, the association between the point cloud data and the image data is established.

The features of the point cloud data and the features of the image are stitched to obtain the fused feature.

The features of the point cloud data are mapped into space of the image by using an interpolation method based on the fused feature. The features of the point cloud data are superimposed onto the image data to generate the fused image. The fused image is corrected and post-processed.

In step S6, the fused image 1 is superimposed onto the fused image 2 by training the convolutional neural network, to generate a mapped 3D model.

Specifically:

The fused image 1 and the fused image 2 are input into the convolutional neural network. The fused image 1 and the fused image 2 are stacked based on a channel dimension of the convolutional neural network to form an n-channel image input, where n represents a total quantity of fused images 1 and 2 input into the convolutional neural network.

A stacked fused image 1 and fused image 2 is input into the convolutional neural network for forward propagation to generate a superimposed image output.

The superimposed image output is post-processed to adjust a range and the quality of the image. For example, pixel value cropping or scaling can be performed to ensure a proper pixel range for the image. In addition, an image enhancement algorithm can be applied to perform contrast adjustment, color balance, and other operations, thereby further improving a visual effect of the image.

The embodiments further provide a device for mapping a 3D point cloud model based on deep learning, including:
 a processor; and
 a memory storing a computer program that can run on the processor.

The computer program is executed by the processor to implement the method for mapping a 3D point cloud model based on deep learning.

The above description of the disclosed embodiments enables those skilled in the art to achieve or use the present disclosure. Various modifications to these embodiments are readily apparent to those skilled in the art, and the generic principles defined herein may be practiced in other embodiments without departing from the spirit or scope of the present disclosure. Accordingly, the present disclosure will not be limited to these embodiments shown herein, but is to fall within the widest scope consistent with the principles and novel features disclosed herein.

What is claimed is:

1. A method for mapping a three-dimensional (3D) point cloud model based on deep learning, comprising following steps:
 S1, collecting point cloud data by using a sonar and a laser radar, capturing image data by using a camera, and preprocessing the point cloud data and the image data;
 S2, processing the preprocessed image data by using a convolutional neural network, and extracting features of the image data to obtain a feature-enhanced image; and processing the preprocessed point cloud data by using a PointNet point cloud processing network, extracting features of the point cloud data, and constructing a 3D model of the point cloud data by using a triangular mesh;

S3, calibrating the laser radar and the camera, determining a geometric relationship between the laser radar and the camera, and aligning the 3D model and the enhanced image spatially and temporally;

S4, performing projection mapping from the enhanced image onto the aligned 3D model, and superimposing location information in the point cloud data onto texture information of the image to obtain a first fused image with point cloud geometry information and image color information;

wherein step S4 specifically comprises:

projecting the aligned 3D model onto the enhanced image, and mapping 3D coordinates of the 3D model onto 2D coordinates of the enhanced image;

back-projecting the aligned enhanced image onto the 3D model, and back-projecting a pixel in the enhanced image onto 3D space of the 3D model; and registering projected and back-projected data, and adjusting a location and a posture of the projected and back-projected data;

S5, fusing the features of the point cloud data and the features of the image data to obtain a second fused image with a fused feature;

wherein step S5 specifically comprises:

matching the features of the point cloud data and the features of the image data by using a feature matching algorithm, and establishing an association between the point cloud data and the image data, wherein the features of the point cloud data comprise coordinates, a normal vector, and a curvature of a point, and the features of the image data comprise a color histogram, a texture feature, an edge feature, and a corner feature;

stitching the features of the point cloud data and the features of the image to obtain the fused feature; and mapping the features of the point cloud data into space of the image by using an interpolation method based on the fused feature, superimposing the features of the point cloud data onto the image data to generate the fused image, and correcting and post-processing the fused image; and S6, superimposing the first fused image onto the second fused image by training the convolutional neural network, to generate a mapped 3D model;

wherein step S6 specifically comprises:

inputting the first fused image and the second fused image into the convolutional neural network, and stacking the first fused image and the second fused image based on a channel dimension of the convolutional neural network to form an n-channel image input, wherein n represents a total quantity of the first and second fused images input into the convolutional neural network;

inputting the stacked first fused image and second fused image into the convolutional neural network for forward propagation to generate a superimposed image output; and post-processing the superimposed image output to adjust a range and quality of the image, comprising pixel value cropping or scaling, contrast adjustment, and color balancing.

2. The method according to claim 1, wherein the preprocessing the point cloud data in step S1 comprises normalization, uniform sampling, and filling; and the preprocessing the image data in step S1 comprises resizing, cropping, scaling, and graying.

3. The method according to claim 1, wherein the processing the preprocessed image data by using a convolutional neural network, and extracting features of the image data to obtain a feature-enhanced image in step S2 specifically comprises:

(1) constructing the convolutional neural network comprising seven convolutional layers, one pooling layer, on activation function, and one fully connected layer, wherein an input of the convolutional neural network is output after passing through a first convolutional layer, a second convolutional layer, a third convolutional layer, a fourth convolutional layer, the pooling layer, a fifth convolutional layer, a sixth convolutional layer, a seventh convolutional layer, the fully connected layer, and the activation function in sequence;

the first convolutional layer comprises one atrous convolution with an atrous factor of 1 and a convolution kernel size of 3×3, and one activation function ReLU;

the second convolutional layer comprises one atrous convolution with an atrous factor of 2 and a convolution kernel size of 3×3, one batch normalization layer, and one activation function ReLU;

the third convolutional layer comprises one atrous convolution with an atrous factor of 3 and a convolution kernel size of 3×3, one batch normalization layer, and one activation function ReLU;

the fourth convolutional layer comprises one atrous convolution with an atrous factor of 4 and a convolution kernel size of 3×3, one batch normalization layer, and one activation function ReLU;

the fifth convolutional layer comprises one atrous convolution with an atrous factor of 3 and a convolution kernel size of 3×3, one batch normalization layer, and one activation function ReLU;

the sixth convolutional layer comprises one atrous convolution with an atrous factor of 2 and a convolution kernel size of 3×3, one batch normalization layer, and one activation function ReLU; and the seventh convolutional layer comprises one atrous convolution with an atrous factor of 1 and a convolution kernel size of 3×3;

(2) inputting the preprocessed image data into the constructed convolutional neural network for forward propagation, calculating an output layer by layer, and extracting the features to obtain the feature-enhanced image; and (3) post-processing the obtained feature-enhanced image to further optimize quality of the image, comprising contrast adjustment, histogram equalization, and denoising.

4. The method according to claim 1, wherein the processing the preprocessed point cloud data by using a PointNet point cloud processing network, and extracting features of the point cloud data in step S2 specifically comprises:

(1) constructing a PointNet model comprising an input transformation network, a feature extraction network, a global feature extraction network, and a classifier, wherein the input transformation network is configured to learn a point cloud transformation matrix, and align the point cloud data to canonical space; the feature extraction network is configured to extract a local feature representation of each point in the point cloud data; the global feature extraction network aggregates a local feature of each point in the point cloud data into a global feature representation as a whole; and the classifier maps a global feature onto an output category;

(2) inputting the preprocessed point cloud data into the constructed PointNet model for forward propagation, and calculating an output layer by layer to obtain feature-enhanced point cloud data, wherein in the input transformation network, coordinates of the point cloud data are transformed through the learned transformation matrix; in the feature extraction network, the local feature of each point in the point cloud data is extracted by using a multilayer perceptron; and in the global feature extraction network, the local feature is aggregated into the global feature representation as a whole; and (3) post-processing the feature-enhanced point cloud data, comprising filtering and point cloud registration.

5. The method according to claim 1, wherein the calibrating the laser radar and the camera in step S3 comprises calibrating internal and external parameters of the laser radar, and calibrating internal and external parameters of the camera, and the internal and external parameters of Laser radar or the camera comprise a location, a posture, a field-of-view angle, and a distortion parameter.

6. The method according to claim 1, wherein a timestamp or a synchronization signal is used to align the 3D model and the enhanced image temporally in step S3.

7. A device for mapping a 3D point cloud model based on deep learning, wherein the device comprises:

a processor, and a memory storing a computer program that runs on the processor, wherein the computer program is executed by the processor to implement the method according to claim 1.

* * * * *